(12) United States Patent
Schmand et al.

(10) Patent No.: US 7,924,079 B2
(45) Date of Patent: Apr. 12, 2011

(54) BASELINE RESTORE BASED ON DIODE STAR CONFIGURATION AND TRANSFORMER COUPLING

(75) Inventors: Matthias J. Schmand, Lenoir City, TN (US); Nan Zhang, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 98 days.

(21) Appl. No.: 12/558,007

(22) Filed: Sep. 11, 2009

(65) Prior Publication Data

US 2010/0066426 A1 Mar. 18, 2010

Related U.S. Application Data

(60) Provisional application No. 61/096,330, filed on Sep. 12, 2008.

(51) Int. Cl.
*H03L 5/00* (2006.01)
(52) U.S. Cl. .......................... 327/307; 327/423; 327/419

(58) Field of Classification Search .................. 327/307
See application file for complete search history.

(56) References Cited

U.S. PATENT DOCUMENTS

| | | | | | |
|---|---|---|---|---|---|
| 5,265,266 | A | * | 11/1993 | Trinh | 455/326 |
| 5,401,984 | A | * | 3/1995 | Byatt et al. | 257/107 |
| 5,535,114 | A | * | 7/1996 | Horie et al. | 363/58 |
| 2004/0240237 | A1 | * | 12/2004 | Okayama et al. | 363/39 |
| 2006/0034107 | A1 | * | 2/2006 | West | 363/98 |
| 2008/0304299 | A1 | * | 12/2008 | Bormann | 363/89 |

* cited by examiner

*Primary Examiner* — Lincoln Donovan
*Assistant Examiner* — Ryan C Jager
(74) *Attorney, Agent, or Firm* — Peter L. Kendall

(57) ABSTRACT

A simple, low cost circuit with only passive components, and thus low power consumption, is provided for baseline restoration of an AC coupled signal. The circuit includes a passive network of diodes arranged in a star configuration and an RF-transformer. A differential signal strategy may be employed by including a differential amplifier at the input and output of the passive network.

14 Claims, 5 Drawing Sheets

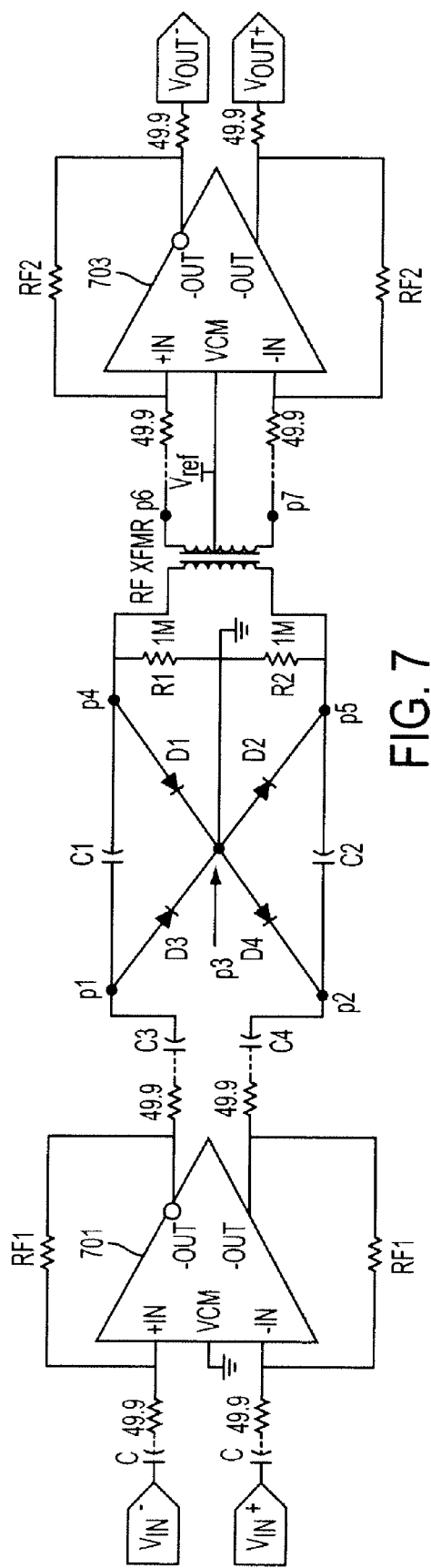
FIG. 7
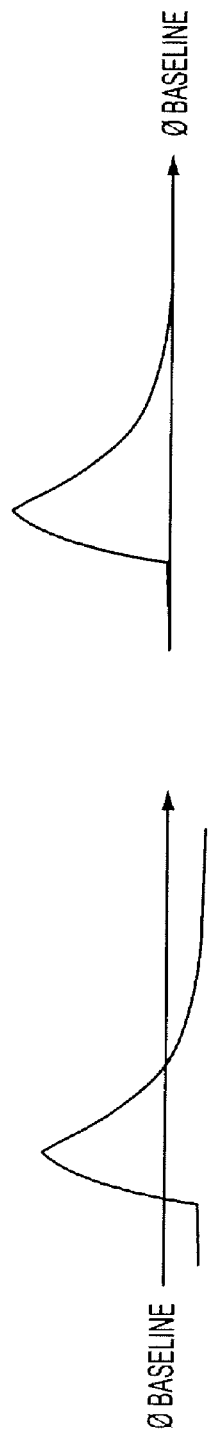
FIG. 8A
FIG. 8B
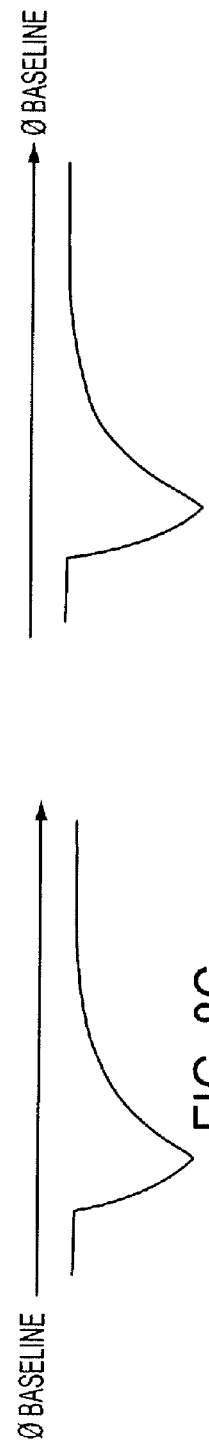
FIG. 8C
FIG. 8D

BASELINE RESTORE BASED ON DIODE STAR CONFIGURATION AND TRANSFORMER COUPLING

TECHNICAL FIELD

The present disclosure relates to restoring baseline shift in AC capacitive coupled signals, particularly as caused by count-rate variants, especially due to radioactive decay in PET applications.

BACKGROUND

In the field of positron emission tomography (PET), it is known that to measure the energy absorbed from a gamma ray interacting in a scintillation crystal, the light from a crystal may be determined by integrating the photo sensor current. This current signal represents the amount of light collected by the sensing photomultiplier tubes (PMTs) or photodiodes. As graphically illustrated in FIG. 1, the integration may be performed by using a uniformly weighted summation of digital samples of the signal. In this method the level of the signal at time $t(0)$ is zero volts.

Alternating current (AC) capacitive coupling strategies are commonly used in (PMT) based (PET) data acquisition (DAQ) signal paths, particularly for detectors that have a positive high voltage. AC capacitive coupling strategies have also been applied in most of the avalanche photodiode (APD) and other solid-state detectors, such as silicon photomultiplier (SiPM). Baseline shift (i.e., the level at time $t(0)$ deviating from zero) resulting from count-rate variant is an intrinsic artifact in an AC coupling signal path, since the direct current (DC) component of the signal is blocked while the AC components are passed on, which results in the total charge integral across the coupling capacitor remaining zero.

FIG. 2 shows a typical PMT 201 high voltage (HV) bleeder network or bias network with positive HV 203 and AC coupled anode (A) and last dynode ($D_y$) outputs. As indicated, high voltage capacitors $C_1$ and $C_2$ are required to couple the high voltage potential anode (A) or dynode ($D_y$) signals to subsequent readout circuits. Similarly in FIG. 3, which illustrates an APD front-end readout circuit with charge sensitive preamplifier readout, an HV capacitor is used to couple an APD signal with HV potential to the following charge-sensitive preamplifier. An AC-coupling capacitor blocks or removes the DC component of the signals such that only AC components pass through. This has the disadvantages of degrading signal low frequency components, due to the high-pass CR filter formed from each coupling capacitor combined with the impedance of the following circuitry. Moreover, as indicated above, AC capacitive coupling causes baseline shift or baseline wander in count-rate variant conditions.

According to the Campbell theorem, an average DC component $V_{DC}$ of a series of pulses is $V_{DC} = vA_R V$, where $v$ is the average pulse count-rate, $A_R$ is the area of a pulse having unity amplitude, and V is the average amplitude of the signal pulse. Adverting to FIGS. 2 and 3, since signal pulses A and $D_y$ in FIG. 2 and APD output in FIG. 3 are unipolar, $V_{DC}$ is not zero. Further, $V_{DC}$ will be varied when count-rate fluctuates, as $V_{DC}$ is proportional to count-rate $v$. The transmitted signals through the coupling capacitor will be DC-balanced, i.e., the total integral of positive and negative areas is zero. Since $V_{DC}$ will shift to zero after AC coupling, the baseline of the original signals will accordingly shift. This creates errors in timing and energy acquisitions if the baseline is not corrected and restored constantly.

Baseline restoration (BLR) has been of interest in related high energy physics fields for decades. Both analog and digital solutions, such as digital BLR, have been implemented in PET DAQ systems. However, digital BLR is challenging for systems in which the detector output signal includes a significant amount of noise. For example, APD signals have significantly higher noise floors mainly due to intrinsic APD excess noise.

The fundamental analog BLR circuit is a Robinson baseline restorer, illustrated in FIG. 4. The gain (xG) stage 401 is necessary to buffer capacitor $C_C$ along with diode D1, thereby forming CD baseline circuitry.

FIG. 5 shows an improved version of the "quasi-ideal" BLR circuit. For an input pulse with negative polarity, diode $D_1$ will be turned off when point "A" is below zero potential. Diode D1 will turn on when the input pulse rises above zero, then $R_4$, $D_1$, and amplifier 501 form a closed loop forcing point "A" to ground or zero potential. As is evident from FIGS. 4 and 5, prior art BLR circuits require a capacitor, a diode, and an amplifier as the main components for forcing the baselines to maintain a zero potential. Such circuits require low voltage (e.g., about ±5V or less) DC power supplies to support the operational amplifier. However, for PMT based PET detectors, in many cases no low voltage DC power supply is required, and, thus, it is unavailable. Although a high voltage (e.g., between about 1000 V and about 2000 V) is required for such detectors, the high voltage cannot be used for supplying the OPAMP.

A need therefore exists for an improved BLR circuit for an AC capacitive coupling signal path, with only passive components, eliminating the operational amplifier and DC power supplies to support the operational amplifier, to achieve more accurate timing, higher energy resolution, and lower power consumption for PET data acquisition systems.

SUMMARY

The above needs are fulfilled, at least in part, by a baseline restoration circuit comprising a passive network having first and second input terminals coupled to an AC signal path, a plurality of star connected diodes, and a pair of output terminals coupled to a DC signal chain. The passive network is configured to restore baseline shift. The plurality of star connected diodes includes a first diode having a first terminal coupled to the first input terminal, a second diode having a first terminal coupled to the second input terminal, a third diode having a first terminal connected to a first intermediate terminal, and a fourth diode having a first terminal connected to a second intermediate terminal, the first, second, third, and fourth diodes each having a second terminal connected to the star junction. The passive network may further include an RF transformer (RF-XFMR) having first and second transformer primary terminals connected respectively to the first and second intermediate terminals and first and second transformer secondary terminals connected to the circuit output terminals, such that the output is a DC restored signal. Two high value resistors, for example 1 MΩ, each, connected in series between first and second intermediate terminals, with a junction between the resistors connected to the star junction and to a reference potential, may set a midpoint of the star connected diodes to a reference potential, such as ground. First and second differential amplifiers may be operatively connected to the pair of input terminals and to the pair of output terminals, respectively, of the passive network for differential signaling through the passive network. Two AC coupling capacitors may be operatively connected between the first terminals of the first and third diodes and the first terminals of the second and fourth diodes. To provide baseline restoration for a single-ended signal, a second RF-XFMR may have an input coupled to the AC signal path and an output connected to the first differential amplifier to convert the signal to a differential signal for input into the differential amplifier. The RF-XFMR of the passive network then converts the differential signal back to a single-ended output. A reference voltage may also be connected to a center point of the transformer secondary terminals to adjust the voltage level for subsequent circuitry. Therefore, the BLR may bias to a different DC level rather than just conventional ground level (0 volt potential). This facilitates implementing the BLR in modern single power electronics systems in which the DC level is biased at half of the rail in most cases.

The above needs are further fulfilled by a method comprising transmitting a signal through a passive network and performing baseline restoration. The network may include plural star connected diodes and have an input for receiving an AC capacitive coupled signal and an output for transmitting a DC coupled signal. The passive network may further include an RF-XFMR. A reference voltage may be set at the center of the RF-XFMR to adjust the voltage for subsequent circuitry. The midpoint of the star connected diodes may be set to a reference potential, for example ground. A second signal, complementary to the first signal, may be transmitted separately through the passive network. In addition, a single ended signal may be converted to a differential signal with a second RF-XFMR, to provide the two complementary signals. The differential signal may then be converted back to a single-ended output after the baseline restoration with the RF-XFMR of the passive network.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which:

FIG. 7 illustrates a BLR circuit with input and output differential amplifiers, in accordance with exemplary embodiments of the present disclosure;

FIGS. 8A-8D graphically illustrate baseline shift and baseline restoration for $V_{in}^+$ (FIGS. 8A and 8B) and for $V_{in}^-$ (FIGS. 8C and 8D);

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments.

Figure 1:
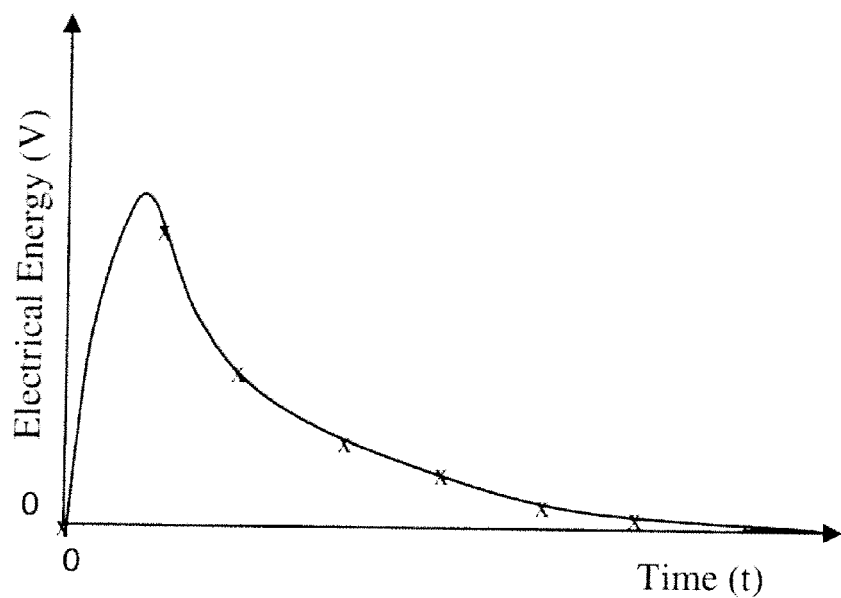
FIG. 1 illustrates a graphical representation of a method of integrating a light signal from a crystal scintillation event.
Figure 2:
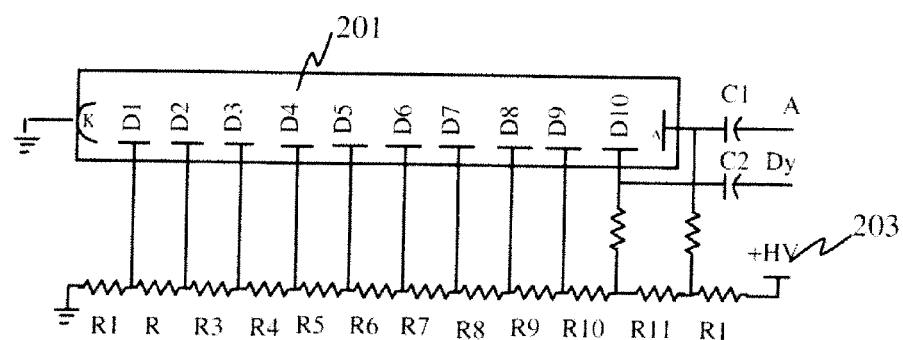
FIG. 2 illustrates a prior art PMT high voltage (HV) bleeder network.
Figure 3:
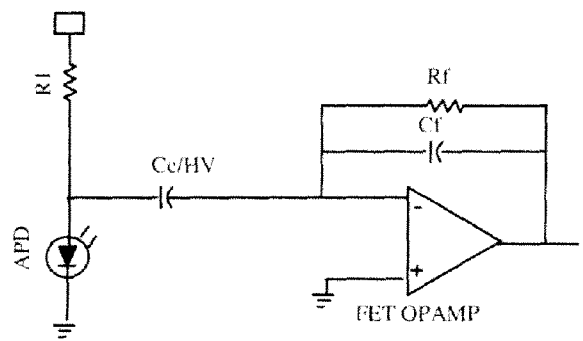
FIG. 3 illustrates a prior art APD front-end readout circuit with charge sensitive preamplifier readout.
Figure 4:
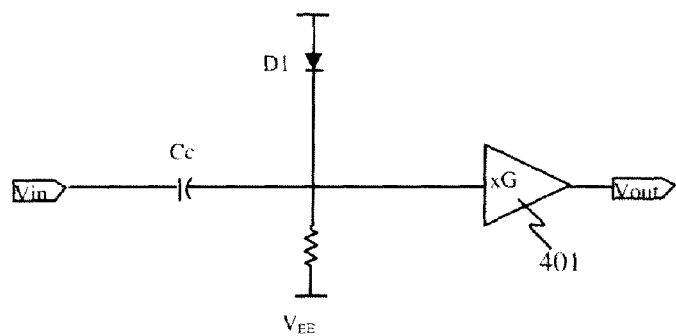
FIG. 4 illustrates a prior art analog BLR circuit.
Figure 5:
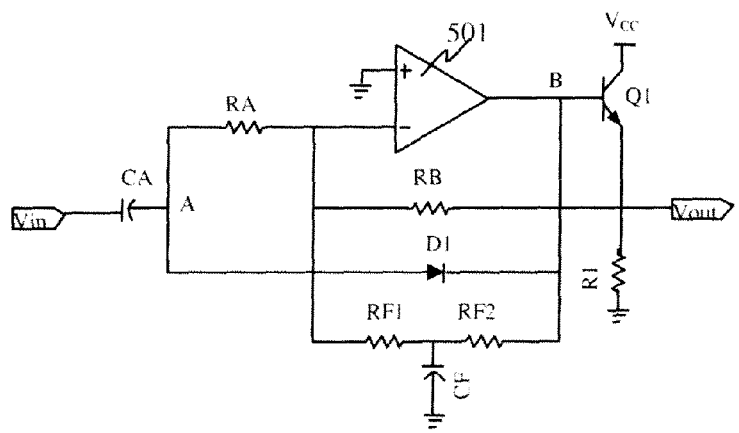
FIG. 5 illustrates an alternate prior art BLR circuit.
Figure 6:
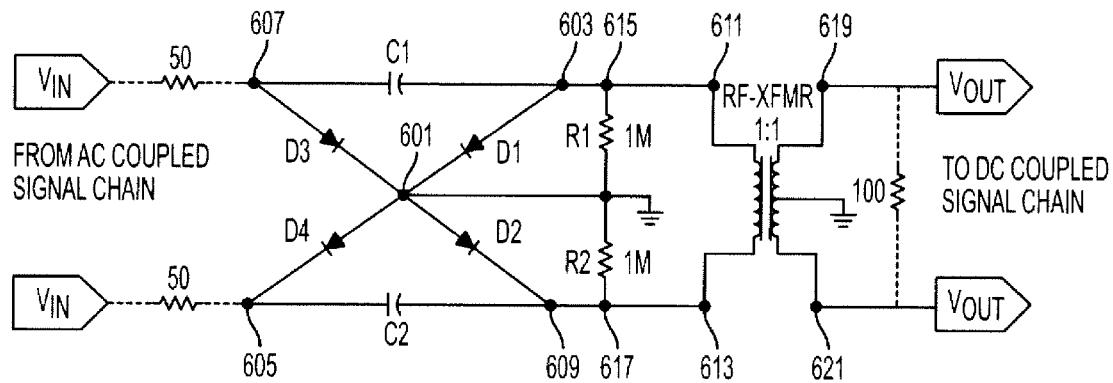
FIG. 6 illustrates a BLR circuit, in accordance with exemplary embodiments of the present disclosure.

Adverting to FIG. 6, an analog BLR circuit, according to an exemplary embodiment of the present disclosure, is based on a four diode star configuration and an RF-XFMR coupling stage. The diode star configuration includes four diodes, D1 through D4. Diodes D1 and D4 are connected in series at junction 601, between junctions 603 and 605. Diodes D3 and D2 are also connected in series at junction 601, between junctions 607 and 609. Input from an AC coupled signal chain is introduced into the baseline restoration circuit at junctions 607 and 605. An RF-XFMR is connected to the diode configuration at junctions 611 and 613. Two high value resistors R1 and R2, for example 1 mega ohm (MΩ) each, connected in series between junctions 615 and 617, between the diode star configuration and the RF-XFMR, are used to set the midpoint of the star configuration to zero potential, i.e., ground. Output from the RF-XFMR is forwarded to a DC coupled signal chain from junctions 619 and 621. The circuitry in this BLR is very simple and can be easily put into a PMT detector or a solid-state APD or SiPM detector. Further, since it is built using only passive components, it has low power consumption and can be produced at low cost. Modern RF-XFMR technology allows the circuit of FIG. 6 to be formed at a relatively small size. Also, it adds very little noise to the signal chain, as no active ICs are used to perform the BLR functionality.

FIG. 7 illustrates a BLR according to an exemplary embodiment of the present disclosure, with two differential amplifiers, 701 and 703, demonstrating BLR input and output stages. The BLR of FIG. 7, like that of FIG. 6, includes four diodes, D1 through D4, in a star configuration, an RF-XFMR coupling stage, and two high value resistors R1 and R2, shown as 1 MΩ each, used to set the midpoint to zero potential. Differential amplifier 701 is connected to diodes D3 and D4 at junctions p1 and p2, respectively. A reference voltage $V_{ref}$ connected to the center of the output side of the RF-XFMR can be adjusted to set a proper common mode voltage level to facilitate subsequent circuits. Differential amplifier 703 is connected to RF-XFMR at junctions p6 and p7. Coupling capacitors C indicate the AC capacitive coupling in the signal paths.

As shown in FIG. 7, a differential (DIFF) signal transfer strategy is applied to perform the BLR function. Differential signaling has the advantages of rejecting common-mode interference and enhancing noise immunity. In DIFF signal transmitting, two complementary signals ($V_{in}^-$ and $V_{in}^+$) are transmitted in two separated traces along the signal paths. One important characteristic is that beyond the AC coupling capacitors C in FIG. 7, the two DIFF signal traces have equal impedance and equal amplitude, but opposite phase. Thus, the overall signal integral (summing up of the two DIFF signals) is always truly DC-balanced regardless of the value of the DC component in each single-ended (SE) signal branch. Therefore, two complementary DC components can be added to the SE signal chains while maintaining the overall DC-balance property in overall DIFF signaling after the capacitor AC-coupling.

As described in FIG. 7, each individual signal at points p1 and p2 is DC-balanced due to the AC coupling in the preceding signal chain (shown between dashed lines). The signal baselines at p1 and p2 have to be varied versus the count-rate to maintain DC-balance individually. The BLR scheme focuses on maintaining DC-balance in the overall DIFF pair. Complementary DC components are added to p1 and p2 so that p4 and p5 can have baselines retained at zero potential (GND) regardless of count-rate changes. FIGS. 8A and 8C graphically show the signal that arrives at points p2 and p1, respectively, with a shifted baseline due to count rate variant. FIGS. 8B and 8D graphically show the signals at points p7 and p6, respectively, after baseline restoration.

Compared with using an operational amplifier (OPAMP), RF-XFMR has the advantages of low cost, very little noise, and miniature sizes, not requiring extra components for power supply bypassing. As illustrated in FIG. 7, the circuit includes an RF-XFMR stage instead of an OPAMP along with capacitors and diodes to perform BLR.

In FIG. 7, point p3 is set to zero potential. The input signals through p1 and p2 are assumed to be negative and positive, respectively. If p4 has a positive potential, p5 will be negative. Then, D1 and D2 will be turned on. Current will flow from D1 to D2 resulting in a discharging of C1 and C2, and ending up with p4 and p5 all being equal in potential to p3, which is zero. When p4 is negative and p5 is positive, D1 and D2 are turned off. Signals then are transmitted through the RF-XFMR to subsequent stages.

RF-XFMR sets up a current closed-loop to maintain the differential characteristics of the overall signal chain. It also equalizes and forces the baseline in p4 and p5 to p3 at zero potential. The center-tap of RF-XFMR can be used to set the new common-mode voltage of p6 and p7 to facilitate subsequent circuits while the baselines are maintained. D1 through D4 along with C1 through C4 forms a cascade BLR circuitry to ensure p4 and p5 have zero potential baselines.

Figure 9:
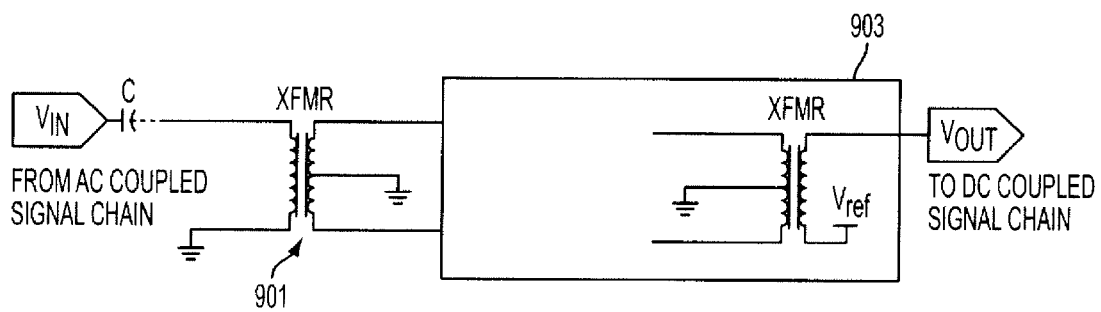
FIG. 9 illustrates BLR circuitry in a single-ended signaling circumstance, in accordance with exemplary embodiments of the present disclosure.

In applications using an AC-coupling strategy in a single-ended signal chain, the BLR circuit of FIG. 7 can be implemented with an additional RF-XFMR. As shown in FIG. 9, the first RF-XFMR 901 is used to convert a single-ended input signal from an AC coupled signal chain to differential, and then BLR is performed with the circuit of FIG. 7, represented by box 903. Compared with the BLR circuit of FIG. 7, the configuration of the second RF-XFMR is alternated in such a way that it works in BLR and also converts the differential signals to a single-ended output to a DC coupled signal chain.

Figure 10:
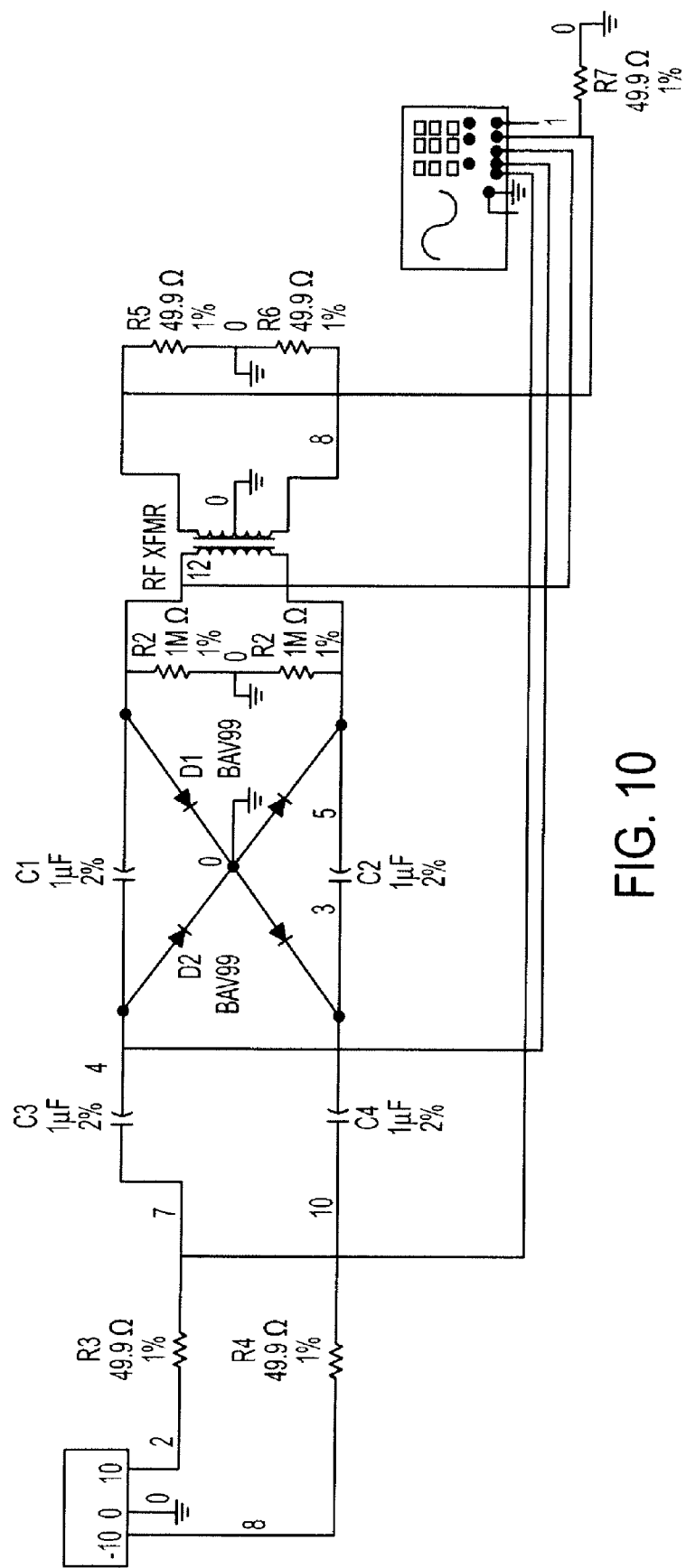
FIG. 10 illustrates a SPICE simulation model including BLR circuitry, in accordance with exemplary embodiments of the present disclosure.

FIG. 10 illustrates a SPICE simulation model including BLR circuitry, in accordance with exemplary embodiments of the present disclosure. The SPICE model may be used to predict PET results.

Embodiments of the present disclosure can achieve several technical effects, including low power consumption, reduced size, fewer components, very low noise, all at a low cost. The present disclosure enjoys industrial applicability in PMT based PET data acquisition, with APDs and SiPMs, and with other solid-state detectors.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A circuit comprising:
   a passive network having first and second input terminals coupled to an AC signal path, the passive network comprising:
   a plurality of star connected diodes comprising:
   a first diode having a first terminal coupled to the first input terminal and a second diode having a first terminal coupled to the second input terminal, the first and second diodes each having a second terminal connected at a star junction;
   a third diode having a first terminal connected to a first intermediate terminal and a fourth diode having a first terminal connected to a second intermediate terminal, the third and fourth diodes each having a second terminal connected to the star junction; and
   a pair of output terminals coupled to a DC signal chain, wherein the passive network is configured to restore baseline shift.

2. The circuit according to claim 1, the passive network further comprising an RF transformer having first and second transformer primary terminals connected respectively to the first and second intermediate terminals and first and second transformer secondary terminals connected to the circuit output terminals.

3. The circuit according to claim 2, further comprising two high value resistors connected in series between the first and second intermediate terminals, a junction between the resistors connected to the star junction and to a reference potential.

4. The circuit according to claim 3, wherein the value of the resistors is about 1 MΩ.

5. The circuit according to claim 2, further comprising a first differential amplifier operatively connected to the pair of input terminals and a second differential amplifier coupled to the pair of output terminals.

6. The circuit according to claim 5, further comprising a second RF transformer having an input coupled to the AC signal path and an output connected to the first differential amplifier.

7. The circuit according to claim 5, further comprising a pair of AC coupling capacitors connected respectively between the first terminals of the first and third diodes and the first terminals of the second and fourth diodes.

8. The circuit according to claim 2, further comprising a reference voltage connected to a center point of the transformer secondary terminals.

9. A method comprising:
   transmitting a signal through a passive network, the network comprising plural star connected diodes and having an input for receiving an AC capacitive coupled signal and an output for transmitting a DC coupled signal; and
   performing baseline restoration.

10. The method according to claim 9, wherein the passive network further comprises an RF-transformer.

11. The method according to claim 10, further comprising setting a reference voltage at the center of the RF transformer.

12. The method according to claim 11, further comprising setting a midpoint of the star connected diodes to a reference potential.

13. The method according to claim 10, further comprising transmitting a second signal, complementary to the first signal, separately through the passive network.

14. The method according to claim 10, further comprising:
   converting a single ended signal to a differential signal with a second RF transformer prior to the performing step; and
   converting the differential signal to a single ended output with the first RF transformer.

* * * * *